(12) United States Patent
Robin et al.

(10) Patent No.: US 6,731,930 B2
(45) Date of Patent: May 4, 2004

(54) OVER-THE-AIR PROGRAMMING METHOD FOR WIRELESS COMMUNICATION DEVICE

(75) Inventors: John F. Robin, Westmont, IL (US); Suresh Sethuraman, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 24 days.

(21) Appl. No.: 10/218,545

(22) Filed: Aug. 14, 2002

(65) Prior Publication Data

US 2004/0033798 A1 Feb. 19, 2004

(51) Int. Cl.[7] .............................. H04M 3/00; H04Q 7/20
(52) U.S. Cl. ...................... 455/419; 455/418; 455/420; 455/422.1; 455/424; 455/425; 455/466
(58) Field of Search ............................... 455/418, 419, 455/420, 422.1, 424, 425, 435.1, 466; 370/328, 338

(56) References Cited

U.S. PATENT DOCUMENTS

| | | | | |
|---|---|---|---|---|
| 5,297,192 A | * | 3/1994 | Gerszberg | 379/59 |
| 5,603,084 A | * | 2/1997 | Henry, Jr. et al. | 455/33.1 |
| 5,887,254 A | * | 3/1999 | Halonen | 455/419 |
| 6,047,071 A | * | 4/2000 | Shah | 380/273 |
| 6,195,546 B1 | * | 2/2001 | Leung et al. | 455/419 |
| 6,308,061 B1 | * | 10/2001 | Criss et al. | 455/418 |
| 6,381,454 B1 | | 4/2002 | Tiedemann, Jr. et al. | |
| 6,587,684 B1 | * | 7/2003 | Hsu et al. | 455/419 |
| 6,622,017 B1 | * | 9/2003 | Hoffman | 455/419 |

FOREIGN PATENT DOCUMENTS

| | | |
|---|---|---|
| WO | WO 01/63900 A1 | 8/2001 |
| WO | WO 02/44892 A2 | 6/2002 |

* cited by examiner

*Primary Examiner*—William Trost
*Assistant Examiner*—Meless Zewdu
(74) *Attorney, Agent, or Firm*—Shigeharu Furukawa

(57) ABSTRACT

A method for programming a wireless portable communication device (104) over the air with a wireless communication network (102). An end user may request to have his wireless portable communication device programmed or the device may be programmed to automatically request at a predetermined time interval. The communication network (104) may remotely program an individual wireless portable communication device (104), or may remotely program a group of wireless portable communication devices (112).

5 Claims, 6 Drawing Sheets

OVER-THE-AIR PROGRAMMING METHOD FOR WIRELESS COMMUNICATION DEVICE

FIELD OF THE INVENTION

The present invention relates generally to the field of radio communications. More specifically, the present invention relates to an over-the-air programming method for a wireless communication device.

BACKGROUND OF THE INVENTION

When wireless communication devices, such as wireless radiotelephones or cellular phones, are manufactured and sold to a customer such as a network operator or a service provider, the devices are generally programmed in two phases. More specifically, when a group of the same series of the devices is manufactured, in the first phase, the devices are programmed with base software comprising features and data that are common among all the devices in the group. The second phase of programming, referred here as a flex file, may comprise a set of customer or regional specific requirements, new features, security and distribution provisions. An example of the customer specific requirements is a series of the same phones distributed to two carriers. Two carriers, Carrier A and Carrier B, decide to purchase the same series wireless phones from one manufacturer. To a user, there may be very few differences externally between cellular phones from Carrier A and from Carrier B. In order to distinguish its phone from other phones supported by other carriers, Carrier A may wish to display its own company symbol as the user turns on the phone. Carrier B may also wish to distinguish its phone from other carriers' phones but may wish to display its name at the top of the screen.

An example of the region specific requirements is a frequency band assignment based upon the available band in a given area of the world. A manufacturer may produce a cellular phone capable of functioning in different parts of the world using global-system for mobile (GSM) protocol comprising 900 MHz, 1800 MHz, and 1900 MHz. In the United States, only the 1900 MHz band is available for the GSM, while in Europe, both the 900 MHz and 1800 MHz bands are available but not the 1900 MHz band. Therefore, by knowing in which region the phones will be operated, the manufacturer is able to program the phones for only what is needed, and possibly reducing the programming time and reducing the required memory size for the phones.

For a series of phones that have been in production for some time, new features, which have been unavailable for the earlier phones, may be programmed into the newer phones.

Currently, the programming the phones requires an electrical connection to each phone, therefore if the phones need to be re-programmed, it would require connecting to each phone, which is labor intensive. For a group of users desiring to have new features, which are available to the same but newer phones, each user would be required to bring his phone back to a service center or to a distributor capable of such updating, or may be required purchase new phones in order to enjoy the benefit of the new features.

Accordingly, there is a need for a method for programming software, data and features into wireless communication devices individually, or as a group, without requiring physical electrical connection to each device.

SUMMARY OF THE INVENTION

The present invention describes a method for a wireless portable communication device to program software, data, and features over the air from a wireless communication network.

The wireless communication network maintains a server which has a plurality of sets of software, data, and features for the wireless portable communication devices subscribing to the wireless communication network. An individual user may send a request to have his wireless portable communication device programmed or updated to the wireless communication network, and the wireless communication network determines whether new software, data and features are available for the requesting wireless portable communication device, and also determines whether the requesting wireless portable communication device is authorized to receive such update. The wireless portable communication device may be programmed to automatically request for an update at a predetermined time interval.

The wireless portable communication device may be equipped with a feature that is activated by a distribution command from the wireless communication network putting it into a distribution mode. When the wireless communication network sends the distribution command to a group of wireless portable communication devices and putting them into the distribution mode, the wireless communication network broadcasts relevant data to the group of wireless communication devices and programs them all at once instead of individually programming the group of wireless portable communication devices one at a time.

DESCRIPTION OF PREFERRED EMBODIMENTS

The first aspect of the present invention provides a method for a wireless portable communication device, preferably a cellular telephone, to download a first set of software, data, and features over-the air (OTA) from its subscribing network.

Figure 1:
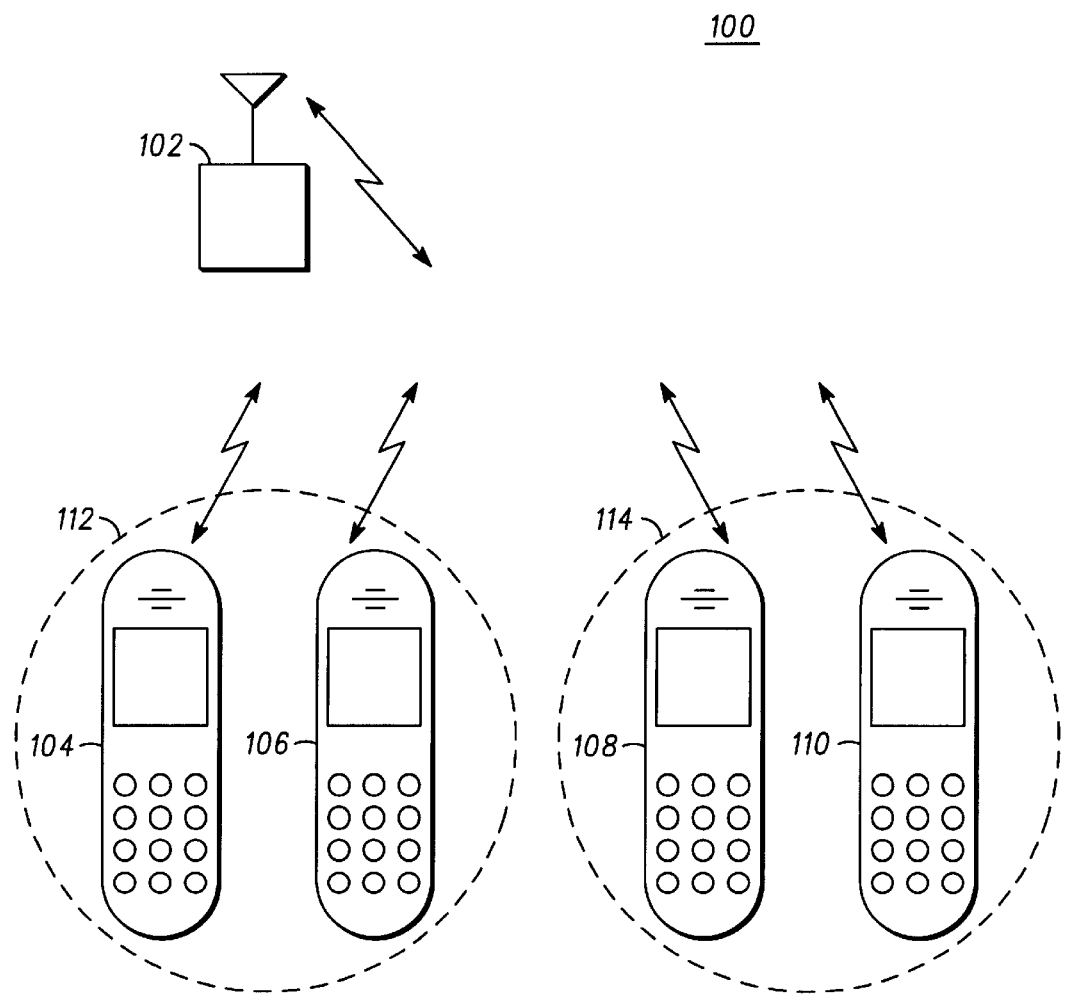
FIG. 1 is a block diagram of a wireless communication system comprising a communication network and wireless portable devices.

FIG. 1 illustrates an exemplary communication system (100) of the present invention comprising a communication network (102) and a first portable communication device (104) among a plurality of wireless portable communication devices (only four, 104, 106, 108, and 110 are shown) all subscribing to the communication network (102). The plurality of wireless portable communication devices is categorized into a plurality of groups (only first group 112 and second group 114 are shown).

Figure 2:
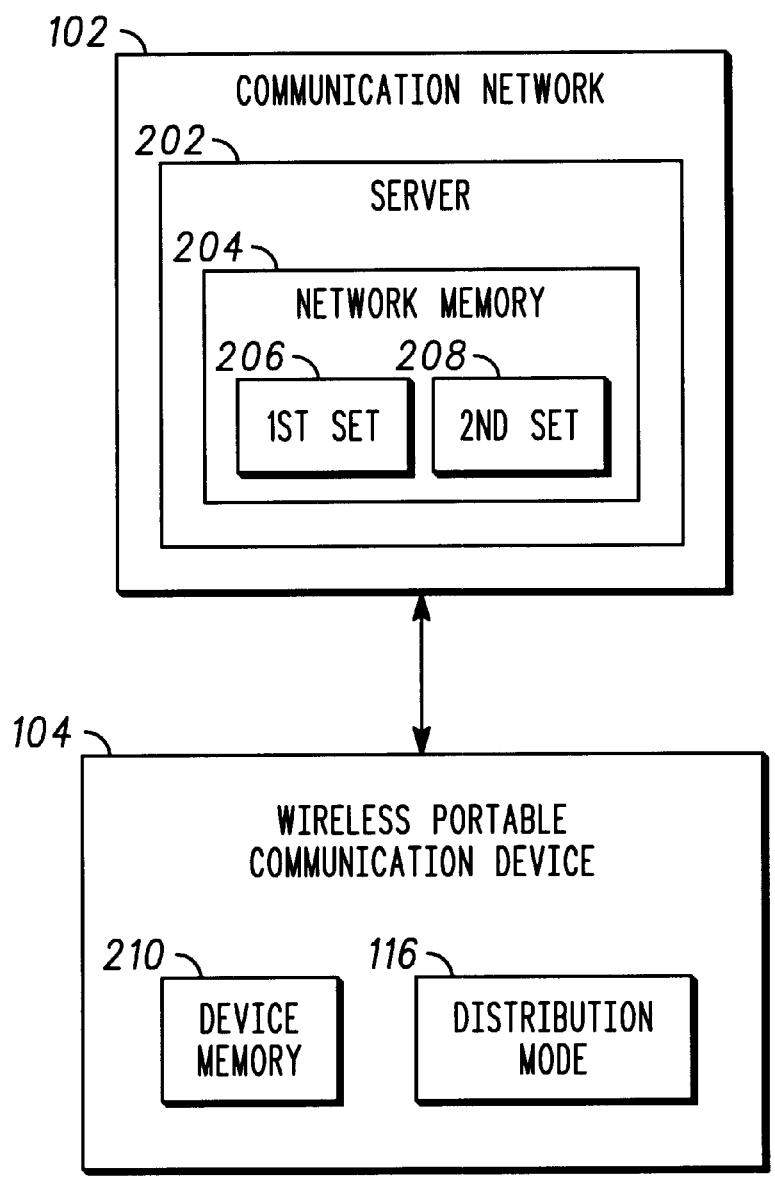
FIG. 2 is a block diagram of components of the communication network and the first wireless portable communication device.

FIG. 2 illustrates an exemplary representation of components of the communication network (102) and the first wireless portable communication device (104). The communication network (102) maintains a server (202) with a network memory (204), and stores in the network memory a plurality of sets of software, data, and features suitable (only first set 206 and second set 208 are shown) for various groups (112 and 114) within the plurality of wireless portable communication devices.

The first wireless portable communication device (104) has a device memory (210) where the first set of software, data, and features (206) are to be downloaded, and a distribution mode (212) which is a function used to download the first set of software, data, and features (206) from the communication network (102).

Figure 3:
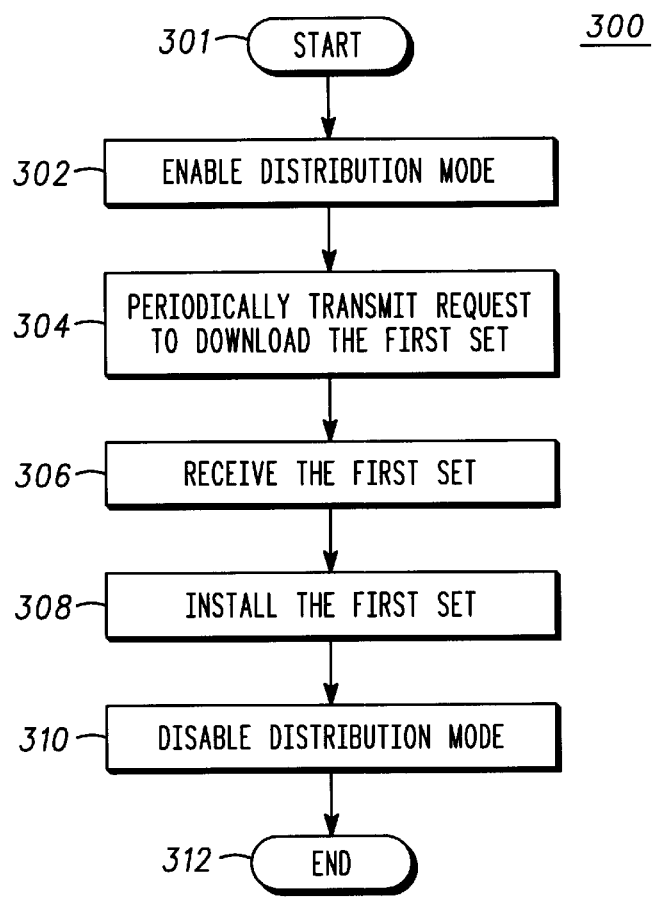
FIG. 3 is an exemplary flowchart illustrating the first preferred embodiment of the present invention.

FIG. 3 illustrates an exemplary flowchart of the first aspect of the present invention. For example, the end user may desire to update the functionality of his cellular phone by downloading a new set of software, data, and features newly made available by the carrier. To download the first set of software, data, and features (206), the first wireless portable communication device (104) must first be operated in the distribution mode (116) in step 302. When the distribution mode is enabled, the first wireless portable communication device temporarily suspends most of its normal functionality and operates specifically to download the first set of software, data, and features form the communication network (102). The first wireless portable communication device then transmits a request to receive the first set of software, data, and features to the communication network in step 304. The request may be transmitted periodically at a predetermined interval to reduce the probability of the communication network missing the request. The first wireless portable communication device may resume normal operation between the request transmissions. After the request is received by the communication network, the first wireless portable communication device receives the first set of software, data, and features from the communication network in step 306, and then installs the first set of software, data, and features in the device memory (210) in step 308. The received first set of software, data, and features may be encrypted for security, and the first wireless portable communication device may be required to decrypt it before installation. When the installation is completed, the distribution mode is disabled in step 310, and the first wireless portable communication device resumes normal operation. Additionally, the first wireless portable communication device may transmit a confirmation of a successful installation of the first set of software, data, and features to the communication network.

Figure 4:
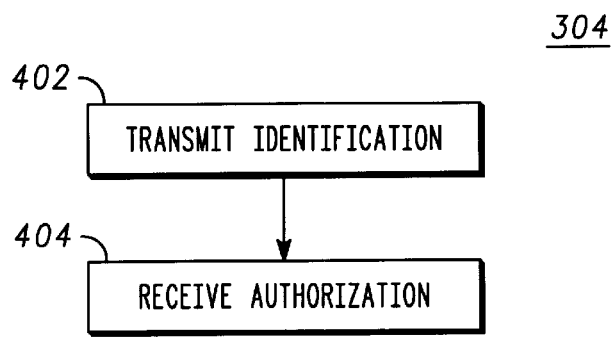
FIG. 4 is an exemplary flowchart illustrating the steps in transmitting the request to download the first set of software, data, and features.

FIG. 4 illustrates an exemplary flowchart further describing the step 304 of transmitting the request to receive the first set of software, data, and features (206) to the communication network (102). When the first wireless portable communication device (104) transmits a request to receive the first set of software, data, and features to the communication network, it also transmits its identification such as its electronic serial number (ESN) to the communication network along with the request in step 402. The transmitted request may be encrypted for security. If the transmitted identification of the first wireless portable communication device is valid, then it receives an authorization from the communication network to download the first set of software, data, and features in step 404. Additionally, the identification of the first portable communication device may be used to determine which set of the plurality of sets of software, data, and features is appropriate for the first wireless portable communication device.

Figure 5:
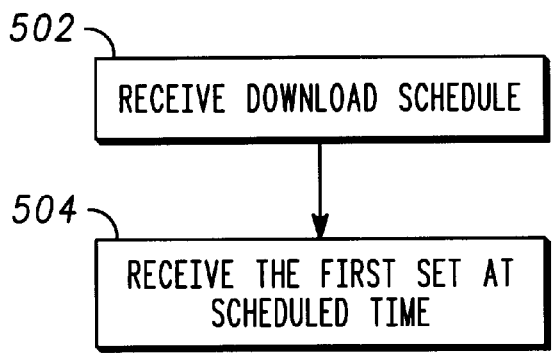
FIG. 5 is an exemplary flowchart illustrating the steps in receiving the first set of software, data, and features at a scheduled time.

FIG. 5 illustrates an exemplary flowchart further describing the step 306 of receiving the first set of software, data, and features (206) from the communication network (102). Instead of receiving the first set of software, data, and features immediately following the request, the first wireless portable communication device (104) first receives a schedule from the communication network regarding when the first wireless portable communication device can expect to receive the first set of software, data, and features in step 502. The communication network transmits the first set of software, data, and features according to the schedule, and the first wireless portable communication device receives the first set of software, data, and features from the communication network at a scheduled time in step 504. Scheduling the downloading time may allow the end user to choose a time that is convenient for him. For example, the end user may make a request to download during the day but may choose an available late night scheduled time when the phone is least likely to be used.

Figure 6:
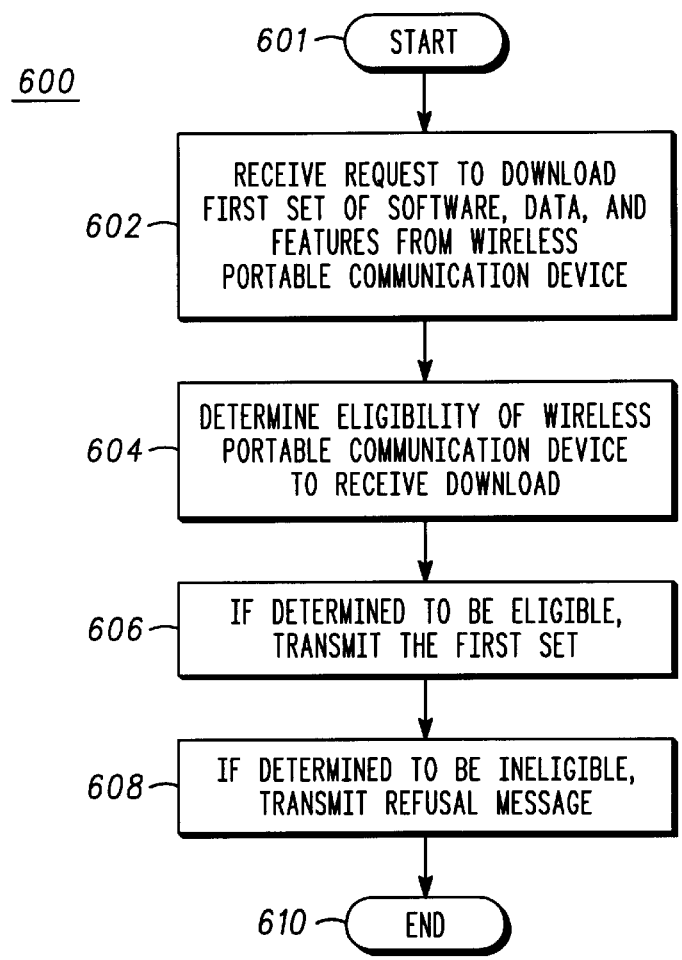
FIG. 6 is an exemplary flowchart illustrating the second preferred embodiment of the present invention.

FIG. 6 illustrates an exemplary flowchart of the second aspect of the present invention. The communication system (100) and components (200) involved have been described previously in FIG. 1 and FIG. 2, and will be referred in the following description.

If the end user desires to update the functionality of his cellular phone, he may make a request by transmitting the request to the communication network for downloading a new set of software, data, and features newly made available by the carrier. In step 602, the communication network (102) receives the request to download the first set of software, data, and features (206) from the first wireless portable communication device (104). In step 604, the communication network determines the eligibility of the first wireless portable communication device to receive the first set of software, data, and features. If the communication network determines that the first wireless portable communication device is eligible, then the communication network transmits the first set of software, data, and features to the first wireless portable communication device in step 606. The transmitted first set of software, data, and features may be encrypted for security, and the first wireless portable communication device may be required to decrypt it before installation. Additionally, if the communication network determines that the first wireless portable communication device is ineligible, then the communication network may transmit a refusal message to the first wireless portable communication device in step 608. After transmitting the first set of software, data, and features to the first wireless portable communication device, the communication network may also receive a confirmation of a successful installation of the first set of software, data, and features from the first wireless portable communication device. Based on the transmission of the first set of software, data, and features to the first wireless portable communication device or on reception of the confirmation of the successful installation, the communication network may keep a record of the downloading status of the first wireless portable communication device.

The communication network (102) may receive an identification of the first wireless portable communication device (104) such as its electronic serial number (ESN) as a part of the request in step 602. The received request may be encrypted for security. The identification of the first wireless portable communication device may be used to determine the eligibility of the first wireless portable communication device to receive the first set of software, data, and features (206) in step 604. For example, there may not be any new set of software, data, and features currently available for, or compatible with the first wireless portable communication device, or the account associated with the identification may be delinquent. Additionally, if there are new sets of software, data, and features currently available, the identification of the first portable communication device may be used to determine which one of new sets is appropriate for the first wireless portable communication device.

Figure 7:
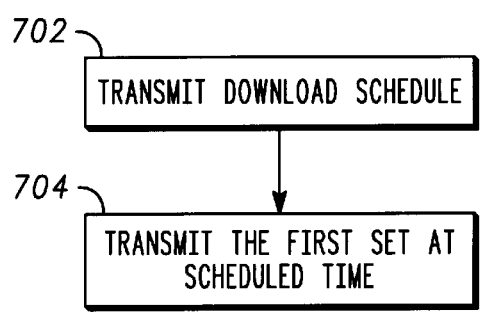
FIG. 7 is an exemplary flowchart illustrating the steps in transmitting the first set of software, data, and features at a scheduled time.

FIG. 7 illustrates an exemplary flowchart further describing the step 606 of transmitting the first set of software, data, and features (206) to the first wireless portable communication device (104). Instead of transmitting the first set of software, data, and features immediately following the request, the communication network (102) first transmits a schedule to the first wireless portable communication device regarding when the first wireless portable communication device can expect to receive the first set of software, data, and features in step 702. The communication network then transmits the first set of software, data, and features according to the schedule in step 704. The schedule may comprise multiple time slots to choose from, allowing the end user to choose a time that is convenient for him. For example, the end user may make a request to download during the day but may choose an available late night scheduled time for downloading when the phone is least likely to be used.

Figure 8:
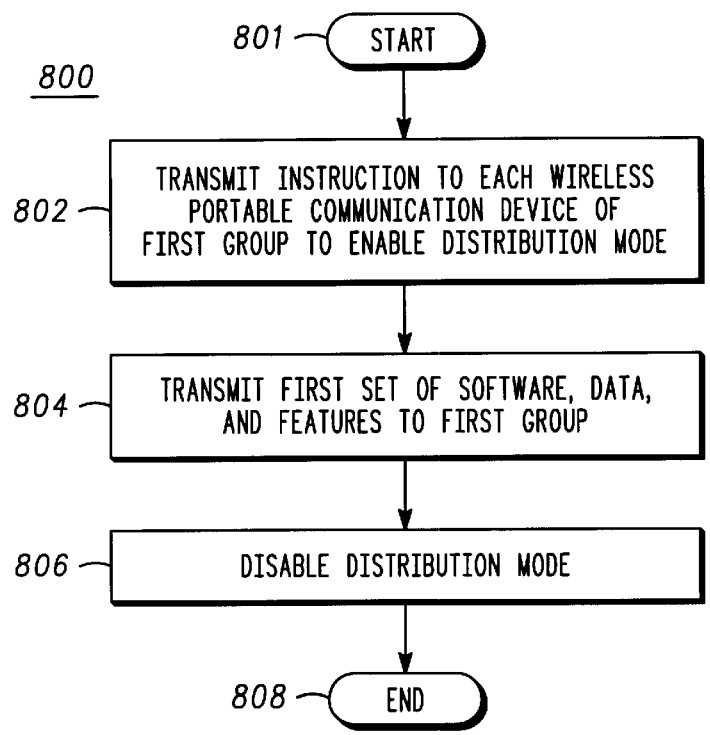
FIG. 8 is an exemplary flowchart illustrating the third preferred embodiment of the present invention.

FIG. 8 illustrates an exemplary flowchart of the third aspect of the present invention. The communication system and components involved have been described previously in FIG. 1 and FIG. 2, and will be referred in the following description.

It is generally desirable to postpone the final programming of the wireless portable communication devices, such as cellular telephones, until the customer destination is ascertained. For example, if a manufacturer prepares a group of cellular telephones specifically for Carrier A well in advance, but Carrier A cancels the order, this group of cellular telephones may require reprogramming to become suitable for any other carriers. Instead of reprogramming one device at a time, the manufacturer, within its factory or warehouse operating a communication network for programming its products, may perform a group-programming to reprogram the devices for a different customer. Alternatively, the manufacturer may wait until the customer destination is ascertained, then perform a group-programming to program the devices specifically for the customer. Another example of a group-programming use is for a communication network to update a group of subscriber units. Instead of having each customer come to a service center for an update, the communication network may broadcast a new set of software, data, and features to a group of subscribers eligible for the update.

In step 802, the communication network (102) transmits an instruction to each wireless portable communication device (104 and 106) of the first group of wireless portable communication devices (112) to enable the distribution mode (116). In step 804, the communication network transmits the first set of software, data, and features (206) to the first group of wireless portable communication devices, and then disables the distribution mode in each wireless portable communication device of the first group of wireless portable communication devices in step 806. The instruction for enabling the distribution mode in step 802 may be accomplished by transmitting a special Short Message Service (SMS) message to each wireless portable communication device of the first group.

Figure 9:
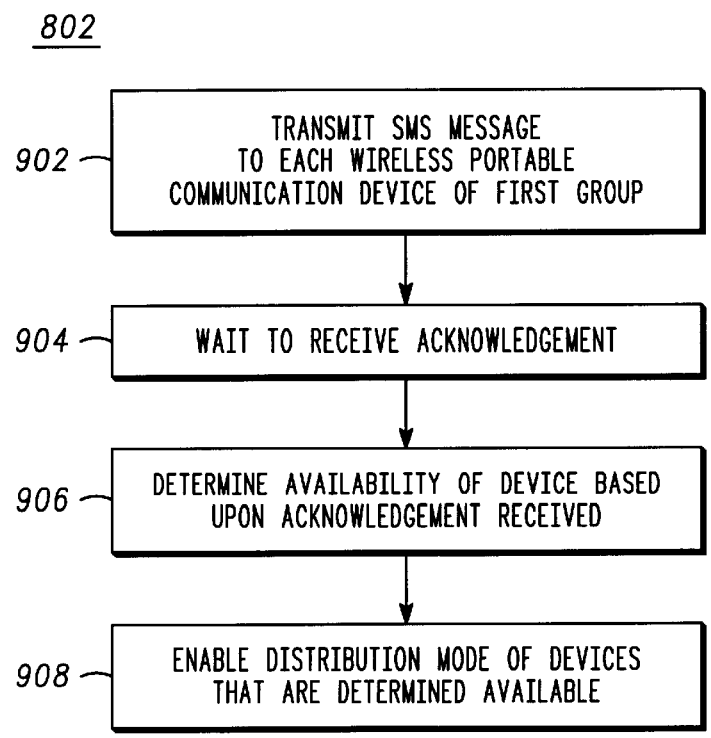
FIG. 9 is an exemplary flowchart illustrating the steps in transmitting the instruction to enable distribution mode.

FIG. 9 illustrates an exemplary flowchart further describing the step 802 of the communication network (102) transmitting an instruction for enabling the distribution mode (116). The communication network first determines which wireless portable communication device is available, and then enables the distribution mode of the wireless portable communication device determined to be available. In step 902, the communication network transmits a special Short Message Service (SMS) message to each wireless portable communication device (104 and 106) of the first group of wireless portable communication devices (112). In step 904, the communication network then waits to receive an acknowledgement of the SMS message reception transmitted from each wireless portable communication device for a predetermined time. The communication network may receive an identification of a responding wireless portable communication device, such as its electronic serial number (ESN), as a part of the acknowledgement in step 904. The received acknowledgement may be encrypted for security. In step 906, the communication network determines availability of the wireless portable communication device based upon the acknowledgement received within the predetermined time. All wireless portable communication devices, which have transmitted the acknowledgement and whose acknowledgements have been received by the communication network within the predetermined time, are determined to be available. The communication network may determine an appropriate set of software, data, and features for each available phone based on its identification. In step 908, the communication network enables the distribution mode of wireless portable communication devices that have been determined to be available.

Figure 10:
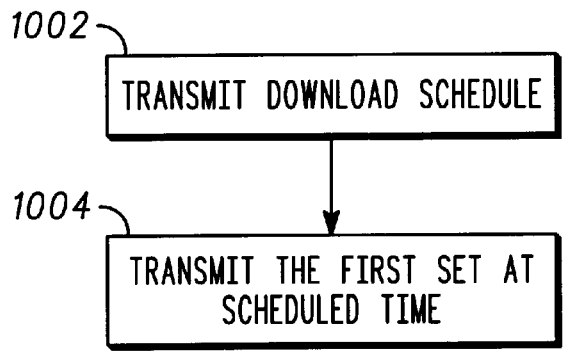
FIG. 10 is an exemplary flowchart illustrating the steps in transmitting the first set of software, data, and features at a scheduled time.

FIG. 10 illustrates an exemplary flowchart further describing the step 804 of transmitting the first set of software, data, and features (206) to the first group of wireless portable communication devices (112). Before transmitting the first set of software, data, and features, the communication network (102) first transmits a schedule regarding when the first set of software, data, and features will be transmitted to the first group of wireless portable communication devices in step 1002. The communication network then transmits the first set of software, data, and features according to the schedule in step 1004. The schedule may comprise multiple time slots to choose from, allowing the end user to choose a time that is convenient for him. For example, for a group-reprogramming of existing subscribers, each end user may arrange to download at a time that is convenient for him but different from others.

After transmitting the first set of software, data, and features to the first group of wireless portable communication devices, the communication network may also receive a confirmation of a successful installation of the first set of software, data, and features from each wireless portable communication device that was involved. Based on the transmission of the first set of software, data, and features to the first wireless portable communication device or on reception of the confirmation of the successful installation, the communication network may keep a record of the downloading status of the wireless portable communication devices.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for a communication network for downloading a preselected set of software, data, and features to a preselected group of wireless portable communication devices of a plurality of wireless portable communication devices, the communication network storing in a network memory a plurality of sets of software, data, and features wherein one of the plurality of the sets is the preselected set, each wireless portable communication device or the preselected group of wireless portable communication devices having a device memory and a distribution mode, the method comprising steps of:

transmitting a Short Message Service message to each wireless portable communication device of the preselected group of wireless portable communication devices;

waiting to receive an acknowledgement of the Short Message Service message reception transmitted from each wireless portable communication device of the preselected group of wireless portable communication devices for a predetermined time;

determining availability of each wireless portable communication device of the preselected group of wireless portable communication devices based upon the acknowledgement received;

enabling the distribution mode of wireless portable communication devices that have been determined to be available;

transmitting the preselected set of software, data, and features to the preselected group of wireless portable communication devices; and disabling the distribution mode in each wireless portable communication device of the preselected group of wireless portable communication devices.

2. The method according to claim 1, wherein the step of transmitting the preselected set of software, data, and features from the communication network further comprises a step of transmitting a schedule for the preselected set of software, data, and features is to be transmitted to each wireless portable communication device of the preselected group of wireless portable communication devices.

3. The method according to claim 2, wherein transmitting the preselected set of software, data, and features to each wireless portable communication device of the preselected group of wireless portable communication devices at a scheduled time.

4. The method according to claim 1 further comprising a step of receiving a confirmation of a successful installation of the preselected set of software, data, and features in the device memory from each wireless portable communication device of the preselected group of wireless portable communication devices.

5. The method according to claim 1 further comprising a step of keeping a record of software, data, and features installed in each wireless portable communication device of the preselected group of wireless portable communication devices.

* * * * *